(12) United States Patent
Rana et al.

(10) Patent No.: US 7,300,090 B2
(45) Date of Patent: Nov. 27, 2007

(54) SPLIT SEAT STOWAGE SYSTEM

(75) Inventors: Paresh Rana, Clawson, MI (US);
Thomas J Hildebrandt, Troy, MI (US)

(73) Assignee: Chrysler LLC, Auburn Hills, MI (US)

( * ) Notice: Subject to any disclaimer, the term of this patent is extended or adjusted under 35 U.S.C. 154(b) by 269 days.

(21) Appl. No.: 11/243,672

(22) Filed: Oct. 5, 2005

(65) Prior Publication Data
US 2007/0075572 A1 Apr. 5, 2007

(51) Int. Cl.
*B60N 2/02* (2006.01)

(52) U.S. Cl. .................. 296/65.09; 296/65.05

(58) Field of Classification Search ............ 296/65.09, 296/65.05, 65.16; 297/85, 15, 423.26, 322, 297/16.2
See application file for complete search history.

(56) References Cited

U.S. PATENT DOCUMENTS

| | | | |
|---|---|---|---|
| 3,097,881 A | | 7/1963 | Agullar |
| 3,171,682 A | | 3/1965 | Buser et al. |
| 3,227,488 A | | 1/1966 | Kosbab et al. |
| 4,494,792 A | * | 1/1985 | Quercy ........................ 297/63 |
| 6,113,187 A | * | 9/2000 | Sugiyama et al. ....... 296/65.09 |
| 6,183,033 B1 | * | 2/2001 | Arai et al. ................ 296/65.09 |
| 6,196,613 B1 | * | 3/2001 | Arai ......................... 296/65.09 |
| 6,488,326 B2 | * | 12/2002 | Wyszogrod et al. ...... 296/65.05 |
| 6,568,756 B2 | * | 5/2003 | Sugimoto et al. ........ 296/65.05 |
| 7,000,968 B2 | * | 2/2006 | Welch et al. .................. 296/68 |
| 7,077,451 B2 | * | 7/2006 | Rhodes et al. ........... 296/65.01 |
| 7,121,609 B2 | * | 10/2006 | Tame ....................... 296/65.11 |
| 7,172,252 B2 | * | 2/2007 | Henning ................. 297/354.13 |
| 7,213,861 B2 | * | 5/2007 | Yokoyama et al. ....... 296/65.09 |
| 2006/0138795 A1 | * | 6/2006 | Weber ...................... 296/65.05 |

FOREIGN PATENT DOCUMENTS

| | | |
|---|---|---|
| DE | 28 43 667 A1 | 4/1980 |
| DE | 37 19 584 A1 | 1/1988 |

\* cited by examiner

*Primary Examiner*—Kiran B. Patel
(74) *Attorney, Agent, or Firm*—Ralph E. Smith

(57) ABSTRACT

A seat assembly for a motor vehicle with a seat bottom attached to a forward leg at a first upper pivot, and a seat back attached to a rear leg. The forward leg is attached to the vehicle at a first lower pivot and rear leg is attached to the vehicle at a second lower pivot. The vehicle includes a floor with a first seat receiving recess in front of the forward leg and a second seat receiving recess behind the rear leg. The seat assembly is capable of being moved between a deployed position and a stowed position in which the seat bottom and forward leg are placed in the first seat receiving recess and the seat back and rearward leg are placed in the second seat receiving recess.

9 Claims, 4 Drawing Sheets

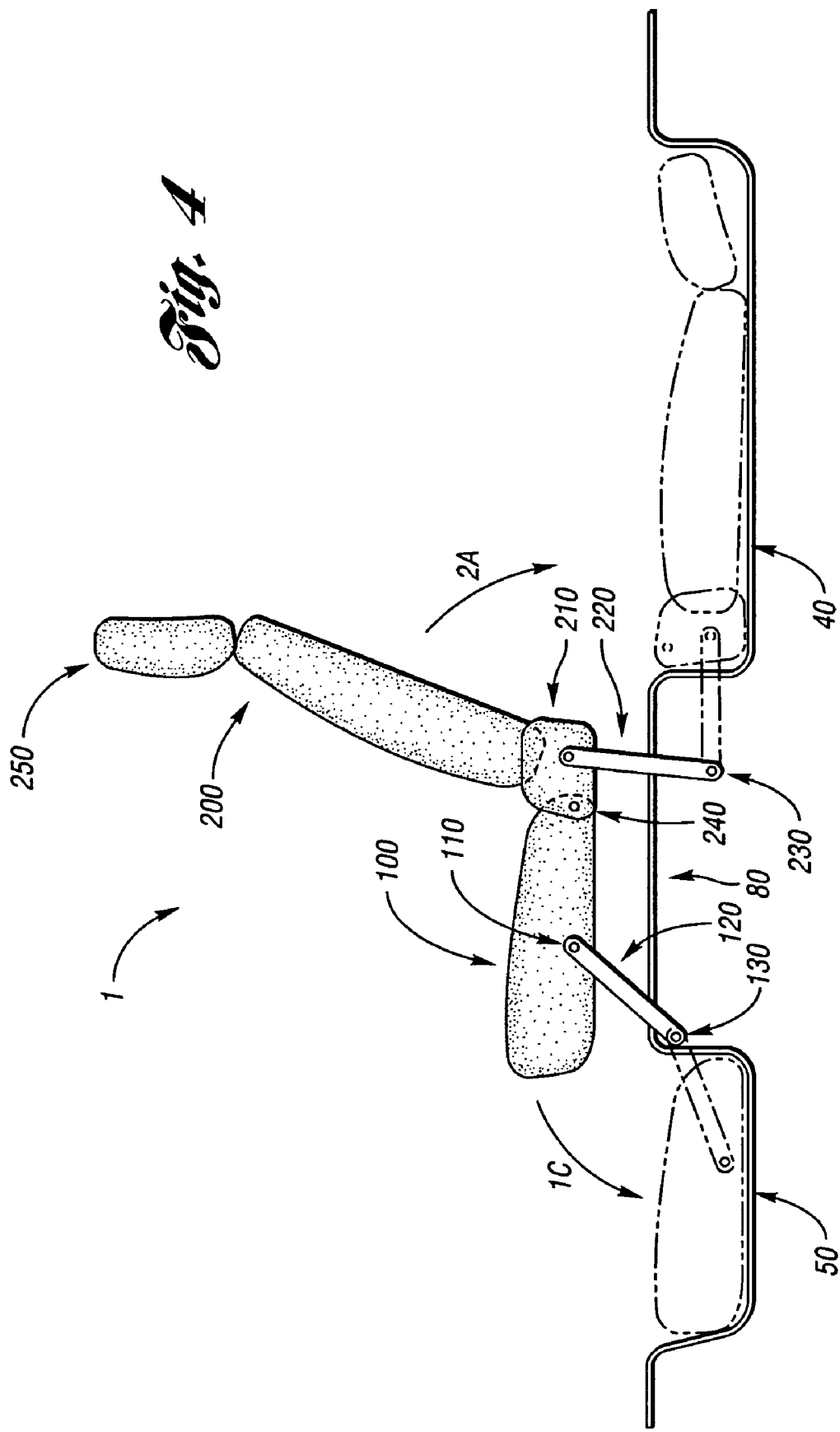

SPLIT SEAT STOWAGE SYSTEM

FIELD OF THE INVENTION

The present invention relates to a seat assembly for a vehicle. More particularly, the invention relates to a seat assembly permitting movement between a seating position and a stowed position.

BACKGROUND OF THE INVENTION

Automotive vehicles include seat assemblies for supporting occupants within the vehicle. Recently vehicles featuring folding seat assemblies that allow the seat to collapse into a stowed position providing for a level load floor that has become a popular feature in vehicles such as minivans. However, it is typically difficult to provide appropriate space under the vehicle load floor that allows the incorporation of known folding seat assemblies into such vehicles.

Therefore, there exists a need in the art to provide a seat assembly that is capable of being mechanically folded operation a seated position and a stowed position, which significantly reduces the under vehicle or in-vehicle storage space needed to stow the seat.

SUMMARY OF THE INVENTION

Accordingly, one aspect of the present invention provides a cost-effective, stowable seat assembly which reduces overall intrusion of the storage space into the floor structure of the vehicle, wherein the seat assembly includes a seat bottom attached to a forward leg at a first upper pivot, and a seat back attached to a rear leg at a second upper pivot. The forward leg is attached to the vehicle at a first lower pivot and rear leg is attached to the vehicle at a second lower pivot. The seat assembly has a latch member protruding from the bottom of the seat bottom and arranged to selectively engage an engagement member attached to the rear leg. The floor of the vehicle has a first seat receiving recess in front of the forward leg and a second seat receiving recess behind the rear leg. The seat bottom is stowed in the first seat receiving recess by rotating the seat bottom about the first upper pivot to a position substantially parallel to the forward leg and rotating the forward leg and the seat bottom forward about the first lower pivot and into the first seat receiving recess. The seat back is stowed in the second seat receiving recess by rotating the seat back and the rearward leg about the second lower pivot and into the second seat receiving recess.

Another aspect of the present invention includes a seat assembly having a seat bottom attached to a forward leg at a first upper pivot, and a seat back attached to a rear leg at a second upper pivot. The forward leg is attached to the vehicle at a first lower pivot and rear leg is attached to the vehicle at a second lower pivot. The seat assembly has a latch member protruding from the bottom of the seat bottom and arranged to selectively engage an engagement member attached to the rear leg. The floor of the vehicle has a first seat receiving recess in front of the forward leg and a second seat receiving recess behind the rear leg. The seat bottom is stowed in the first seat receiving recess by rotating the seat bottom about the first upper pivot to a position substantially parallel to the forward leg and rotating the forward leg and the seat bottom forward about the first lower pivot and into the first seat receiving recess. The seat back is stowed in the second seat receiving recess by rotating the seat back about the second upper pivot until the forward surface of the seat back faces rearward and rotating the seat back and the rearward leg about the second lower pivot and into the second seat receiving recess.

Yet another aspect of the present invention comprises a seat assembly with a seat bottom attached to a forward leg at a first upper pivot, and a seat back attached to a rear leg at a second upper pivot. The forward leg is attached to the vehicle at a first lower pivot and rear leg is attached to the vehicle at a second lower pivot. The seat assembly has a latch member protruding from the bottom of the seat bottom and arranged to selectively engage an engagement member attached to the rear leg. The floor of the vehicle has a first seat receiving recess in front of the forward leg and a second seat receiving recess behind the rear leg. The seat bottom is stowed in the first seat receiving recess by rotating the seat bottom about the first upper pivot and the forward leg about the first lower pivot into the first seat receiving recess until the upper surface of the seat bottom faces upward. The seat back is stowed in the second seat receiving recess by rotating the seat back and the rearward leg about the second lower pivot and into the second seat receiving recess.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a side view of a seat assembly according to a third embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
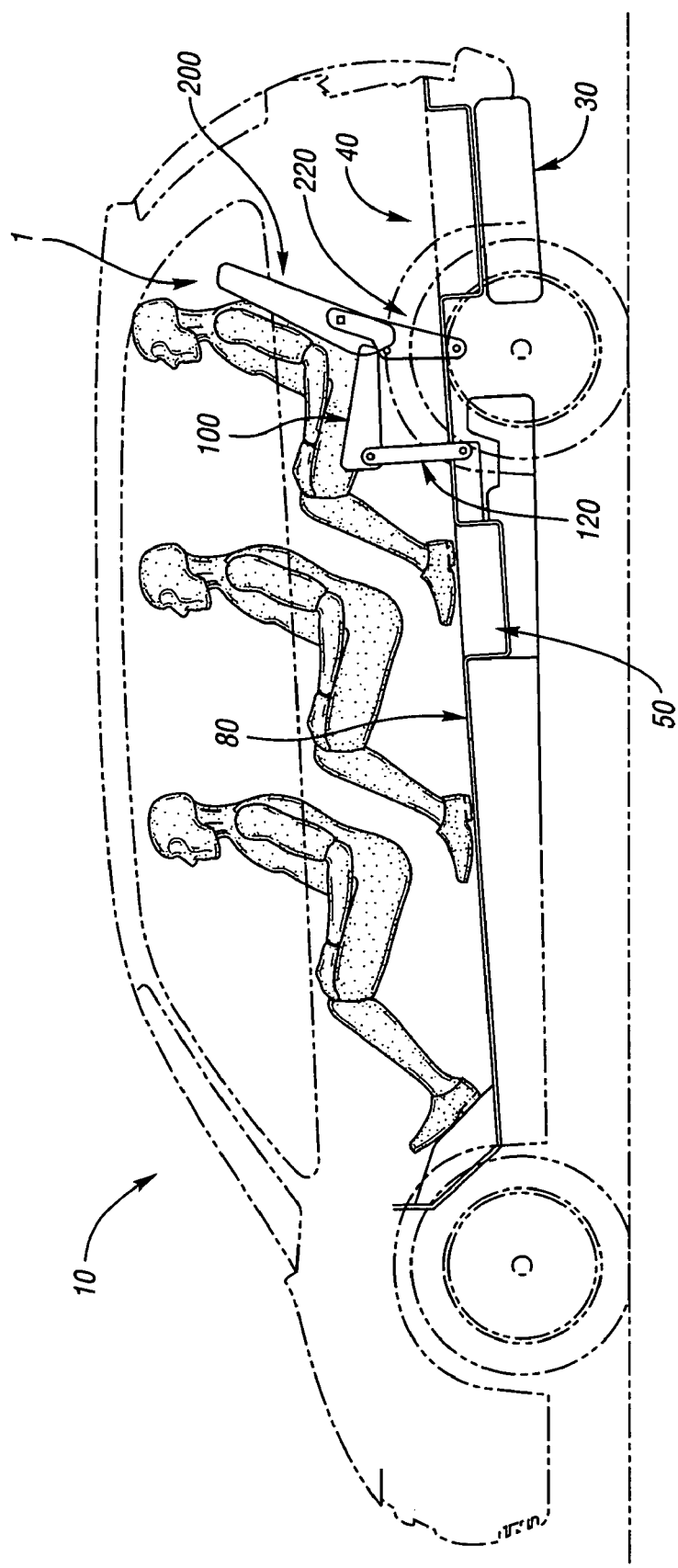
FIG. 1 is a side view of a vehicle including a seat assembly according to a first embodiment of the present invention.
Figure 2:
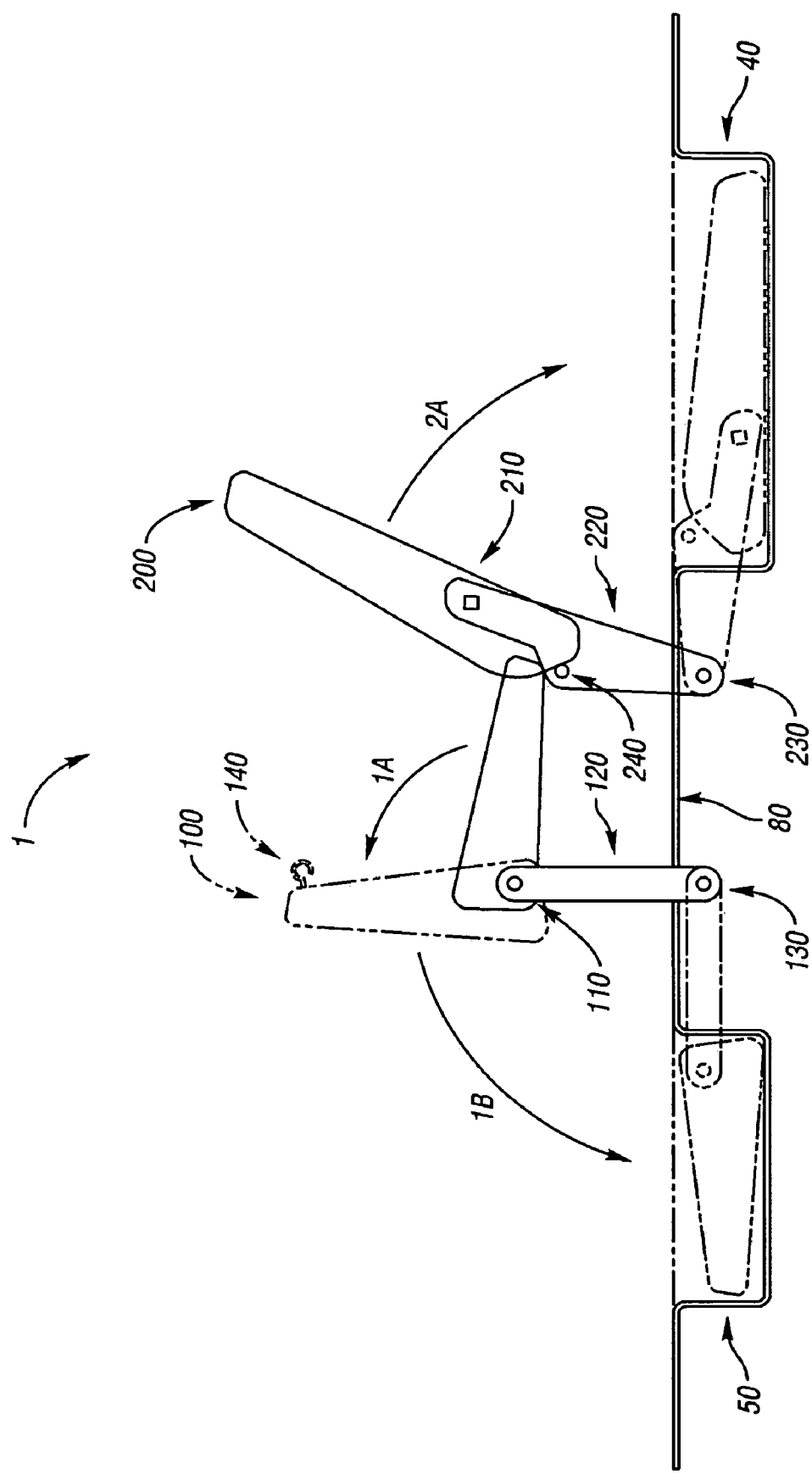
FIG. 2 is a side view of a seat assembly according to a first embodiment of the present invention.

Turning now to the drawings, FIGS. 1 and 2 show a vehicle 10 having a floor 80 and a stowable seat assembly 1 according to a first exemplary embodiment of the present invention. As shown in FIG. 2, the seat assembly 1 includes a seat bottom 100, a seat back 200, and a pair of legs 120 and 220 operatively attaching the seat bottom 100 and seat back 200 to the floor 80. The forward leg 120 has an upper pivot 110 operatively attached to the seat 100, and a lower pivot 130 attached to the floor 80 of the vehicle 10. The rearward leg 220 likewise has an upper pivot 210 operatively attached the seat back 200, and a lower pivot 230 attached to the floor 80 of the vehicle 10. Two seat receiving recesses 40 and 50 are located in the floor 80 of the vehicle 10. Seat receiving recess 50 is located in the floor 80 in front of the seat bottom 100, and second seat receiving recess 40 is located in the floor 80 in back of the seat back 200. In a preferred embodiment, the two seat receiving recesses in the floor are located in a manner that does not require the relocation of the existing spare tire storage area 30 or the vehicle's gas tank 20.

When the seat is in the deployed position, the seat bottom 100 extends substantially perpendicular to the forward leg 120 and the seat back 200 extends generally vertical from the rearward leg 220. Movement of the seat 100 relative to the seat back 200 is prevented by a latch assembly. In an exemplary embodiment, the latch assembly includes a latch member 140 protruding from the bottom of the seat bottom 100 and arranged to be detachably engage to a corresponding engagement member 240 attached to the rearward leg 220. The latch member 140 is arranged such that when the seat bottom 100 is in the deployed position, the latch member 140 engages the engagement member 240 and locks the seat in the deployed position. In this exemplary embodiment, the latch member 140 is a hook and the engagement member 240 is a rod extending from the rearward leg 240. However, those skilled in the art will recognize that a number of alternative latch mechanisms may be utilized.

FIG. 2 shows the movement of the seat assembly 1 between its deployed position and a stowed position according to a first exemplary embodiment of the present invention. As shown in FIG. 2, the seat bottom 100 is moved into the stowed position from the deployed position by first unlocking the latch member 140 protruding from the bottom of the seat bottom 100 from its corresponding engagement member 240 attached to the rearward leg 220 by operation of a release mechanism (not shown). After the seat bottom 100 is unlocked, the seat bottom 100 may be rotated into a position parallel to the forward leg 120 by rotating the seat bottom 100 about an upper pivot 110 in the direction indicated by arrow 1A. The seat bottom 100 and forward leg 120 may then be rotated into the forward seat receiving recess 50 by rotating both the seat bottom 100 and forward leg 120 about a lower pivot 130 in the direction indicated by arrow 1B. Similarly, after the seat bottom 100 is unlocked, the seatback 200 and rearward leg 220 may be rotated into the rearward seat receiving recess 40 by rotating the seatback 200 and rearward leg 220 about a lower pivot 230 in the direction indicated by arrow 2A.

Next, a seat assembly 2 according to a second exemplary embodiment of the present invention is described with reference to FIG. 3. With respect to parts and components having the similar function and effect to those of the first embodiment, the same reference numbers are affixed and the detailed explanation thereof is omitted.

Figure 3:
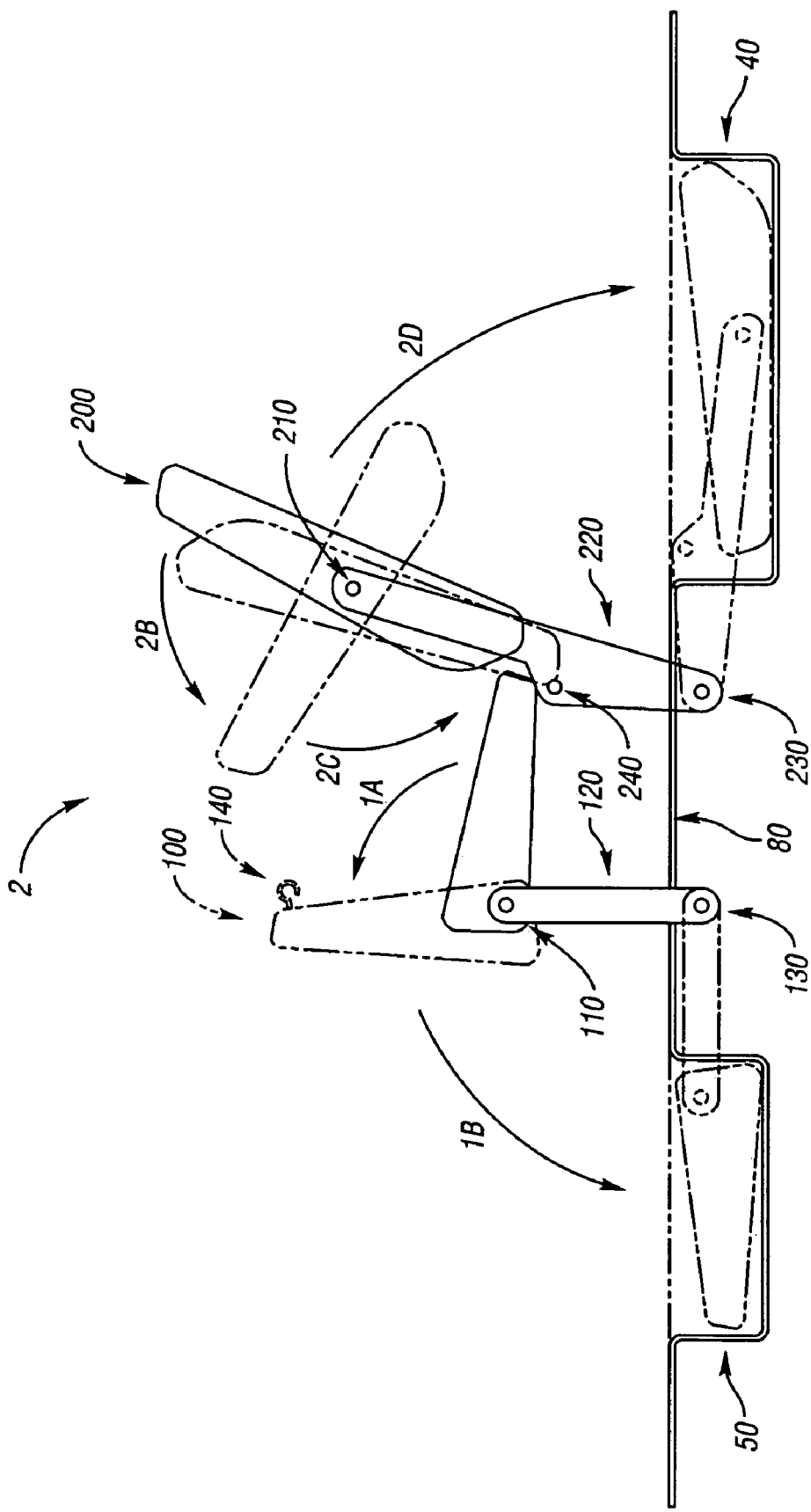
FIG. 3 is a side view of a seat assembly according to a second embodiment of the present invention.

FIG. 3 shows the movement of the seat assembly 2 between its deployed position and a stowed position according to a second exemplary embodiment of the present invention. As shown in FIG. 3, the seat bottom 100 is moved into the stowed position from the deployed position by first unlocking the latch member 140 protruding from the bottom of the seat bottom 100 from the latch member 240 attached to the rearward leg 220 by operation of a release mechanism (not shown). After the seat bottom 100 is unlocked, the seat bottom 100 may be rotated into a position parallel to the forward leg 120 by rotating the seat bottom 100 about the upper pivot 110 in the direction indicated by arrow 1A. The seat bottom 100 and forward leg 120 may then be rotated into the forward seat receiving recess 50 by rotating both the seat 100 and forward leg 120 about the lower pivot 130 in the direction indicated by arrow 1B. Similarly, after the seat bottom 100 is unlocked, the seatback 200 and rearward leg 220 may be placed in a stowed position by first rotating the seatback 200 about the upper pivot 210 in a one hundred eighty degree turn relative to the rearward leg 220 in the direction indicated by arrows 2B and 2C. Subsequently, the seatback 200 and rearward leg 220 may be rotated into the rearward seat receiving recess 40 by rotating the seatback 200 and rearward leg 220 about the lower pivot 230 in the direction indicated by arrow 2D.

Finally, a seat assembly 3 according to a third exemplary embodiment of the present invention is described with reference to FIG. 4. With respect to parts and components having the similar function and effect to those of the first embodiment, the same reference numbers are affixed and the detailed explanation thereof is omitted. It will be appreciated by those skilled in the art that a headrest 250 optionally may be included on any of the exemplary embodiments of the present invention disclosed herein.

FIG. 4 shows the movement of the seat assembly 3 between its deployed position and a stowed position according to a third exemplary embodiment of the present invention. As shown in FIG. 4, the seat bottom 100 is moved into the stowed position from the deployed position by first unlocking the latch member 140 protruding from the bottom of the seat bottom 100 from the latch member 240 attached to the rearward leg 220 by operation of a release mechanism (not shown). After the seat bottom 100 is unlocked, the seat bottom 100 and forward leg 120 may be rotated into the forward seat receiving recess 50 by rotating the seat bottom 100 and an upper pivot 110 and forward leg 120 about a lower pivot 130 in the direction indicated by arrow 1C such that the portion of the seat facing upward in the deployed position likewise faces upward in the stowed position. Similarly, after the seat bottom 100 is unlocked, the seatback 200 and rearward leg 220 may be rotated into the rearward seat receiving recess 40 by rotating the seatback 200 and rearward leg 220 about a lower pivot 230 in the direction indicated by arrow 2A.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat assembly for a motor vehicle:
  a seat bottom attached to a forward leg at a first upper pivot, said forward leg being attached to said vehicle at a first lower pivot;
  a seat back attached to a rear leg, said rear leg being attached to said vehicle at a second lower pivot;
  said seat bottom further having a stop member and said seat back further having an engagement member for selective attachment of said stop member;
  said vehicle including a floor further comprising a first seat receiving recess forward of said forward leg and a second seat receiving recess rearward of said rear leg;
  wherein said seat bottom is received into said first seat receiving recess by rotating said seat bottom about said first upper pivot and rotating said forward leg and said seat bottom forward within said vehicle about said first lower pivot and into said first seat receiving recess; and
  wherein said seat back is received into said second seat receiving recess by rotating said seat back and said rearward leg rearward within said vehicle about said second lower pivot and into said second seat receiving recess.

2. The seat assembly of claim 1 when said stop member is engaged by said engagement member, the seat is locked in a seated position.

3. The seat assembly of claim 1 wherein when said stop member is not engaged by said engagement member, the seat and seat back are capable of movement between a seated position and a stowed position.

4. The seat assembly of claim 1 wherein said stop member comprises a hook and said engagement member comprises a rod extending from the rearward leg.

5. The seat assembly of claim 1 wherein said seat back has a forward surface and is attached to said rear leg at a second upper pivot.

6. The seat assembly of claim 5 wherein said seat back is received into said second seat receiving recess by rotating said seat back about said second upper pivot until said forward surface faces rearward in the vehicle and rotating said seat back and said rearward leg rearward within said vehicle about said second lower pivot and into said second seat receiving recess.

7. The seat assembly of claim 1 wherein said seat bottom has an upper surface.

8. The seat assembly of claim 7 wherein said seat bottom is received into said first seat receiving recess by rotating said seat bottom about said first upper pivot and said forward leg forward about said first lower pivot until said seat bottom is contained in said first receiving recess and said upper surface of said seat bottom faces upwardly.

9. The seat assembly of claim 7 wherein said seat bottom is received into said first seat receiving recess by rotating said seat bottom about said first upper pivot and said forward leg forward about said first lower pivot until said seat bottom is contained in said first receiving recess and said upper surface of said seat bottom faces downwardly.

* * * * *